(12) United States Patent
Komura et al.

(10) Patent No.: US 7,246,377 B2
(45) Date of Patent: Jul. 17, 2007

(54) METHOD AND APPARATUS FOR MEDIATION OF SECURITY INFORMATION, AND A COMPUTER PRODUCT

(75) Inventors: Masahiro Komura, Kawasaki (JP); Seigo Kotani, Kawasaki (JP); Satoru Torii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 824 days.

(21) Appl. No.: 09/739,645

(22) Filed: Dec. 20, 2000

(65) Prior Publication Data
US 2002/0016920 A1    Feb. 7, 2002

(30) Foreign Application Priority Data
Aug. 2, 2000    (JP)    ............................. 2000-234555

(51) Int. Cl.
*G06F 21/00*    (2006.01)
(52) U.S. Cl. .............................. 726/26; 705/50; 705/65
(58) Field of Classification Search ................... 710/36
See application file for complete search history.

(56) References Cited

U.S. PATENT DOCUMENTS

| | | | | |
|---|---|---|---|---|
| 5,835,911 A | * | 11/1998 | Nakagawa et al. | 707/203 |
| 5,889,942 A | * | 3/1999 | Orenshteyn | 713/201 |
| 6,151,643 A | * | 11/2000 | Cheng et al. | 710/36 |
| 6,185,545 B1 | * | 2/2001 | Resnick et al. | 705/40 |
| 6,327,578 B1 | * | 12/2001 | Linehan | 705/65 |
| 6,327,617 B1 | * | 12/2001 | Fawcett | 709/219 |
| 6,678,666 B1 | * | 1/2004 | Boulware | 705/66 |
| 2003/0158910 A1 | * | 8/2003 | Toyouchi et al. | 709/218 |

OTHER PUBLICATIONS

Forrest J. Cavalier, "Some Implications of Bazaar Size", Third Draft Aug. 11, 1998 III Mib Software; pp. 14. "http://web.archive.org/web/19991013203739/www.mibsoftware.com/bazdev/0012.htm".*
Randall Hyde, 1997; pp. 1-3; "http://www.cs.ucr.edu/~rhyde/cs140/cs140S97.htm".*

* cited by examiner

*Primary Examiner*—Nasser Moazzami
*Assistant Examiner*—Carl Colin
(74) *Attorney, Agent, or Firm*—Staas & Halsey LLP

(57) ABSTRACT

The security information mediation apparatus comprises security information registering unit which registers security information supplied by a client of a user, a transfer unit which transfers the security information registered in the security information registering unit to a client of a program developer. This client judges the usefulness of the security information and outputs reply information when the security information is useful. A reply information registering unit receives the reply information and payment information that indicates payment of the information presentation fee of the corresponding security information from the developer client. A transfer unit transfers the reply information and payment information to the client of the user.

15 Claims, 17 Drawing Sheets

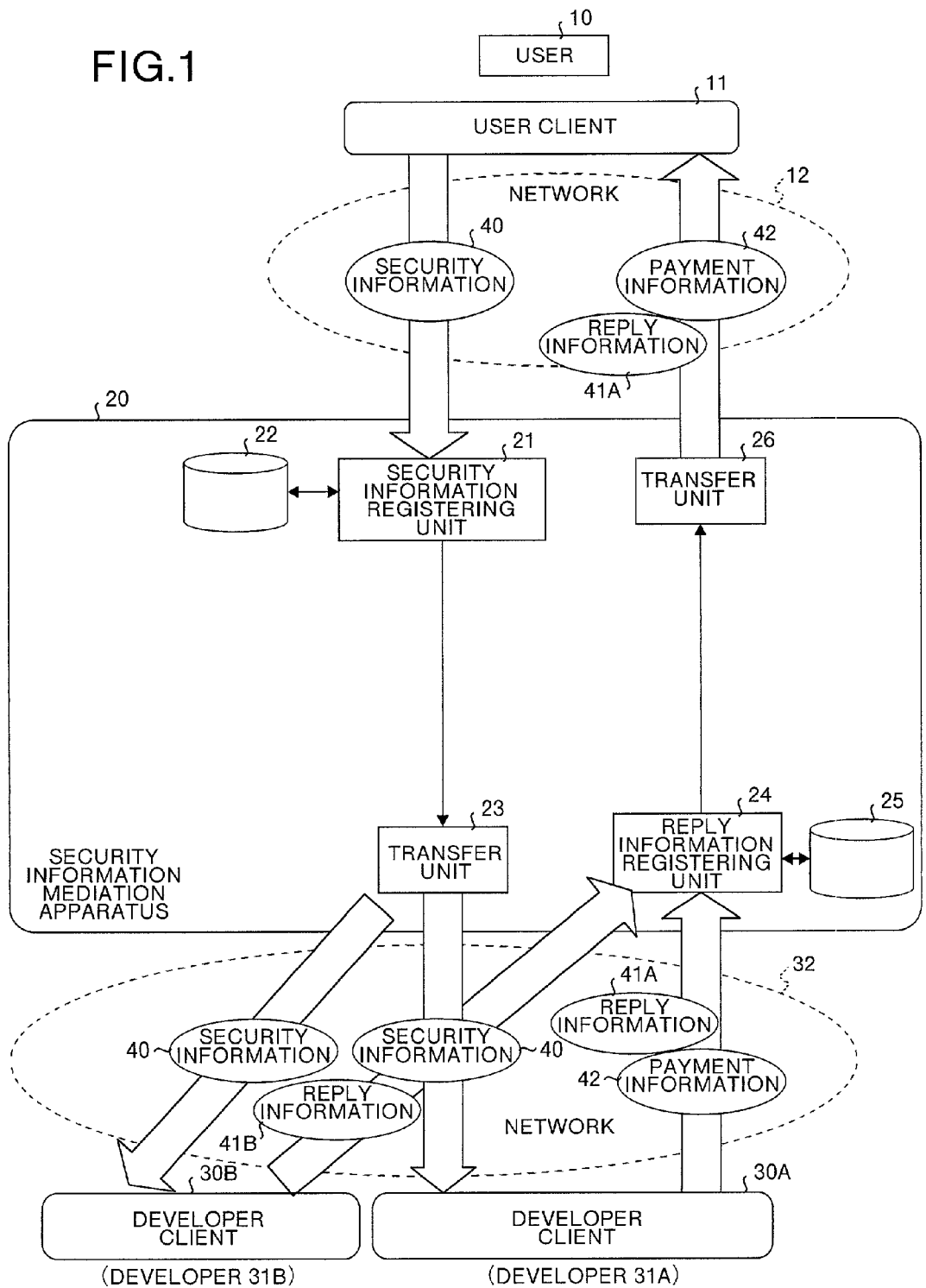

FIG.2A

40 ; SECURITY INFORMATION

| REGISTERING PERSON | CONTENT OF SECURITY INFORMATION |
|---|---|
| USER 10 | BUG PROBLEM OF SOFTWARE X |

FIG.2B

41A ; REPLY INFORMATION

| REPLYING PERSON | JUDGING RESULT | REGISTERING PERSON | CONTENT OF SECURITY INFORMATION |
|---|---|---|---|
| DEVELOPER 31A | VALID | USER 10 | BUG PROBLEM OF SOFTWARE X |

FIG.2C

41B ; REPLY INFORMATION

| REPLYING PERSON | JUDGING RESULT | REGISTERING PERSON | CONTENT OF SECURITY INFORMATION |
|---|---|---|---|
| DEVELOPER 31B | INVALID | USER 10 | BUG PROBLEM OF SOFTWARE X |

FIG.2D

42 ; PAYMENT INFORMATION

| AMOUNT PAID | PAID TO | PAID BY | METHOD OF PAYMENT |
|---|---|---|---|
| 10000 YEN | USER 10 | DEVELOPER 31A | ELECTRONIC SETTLEMENT |

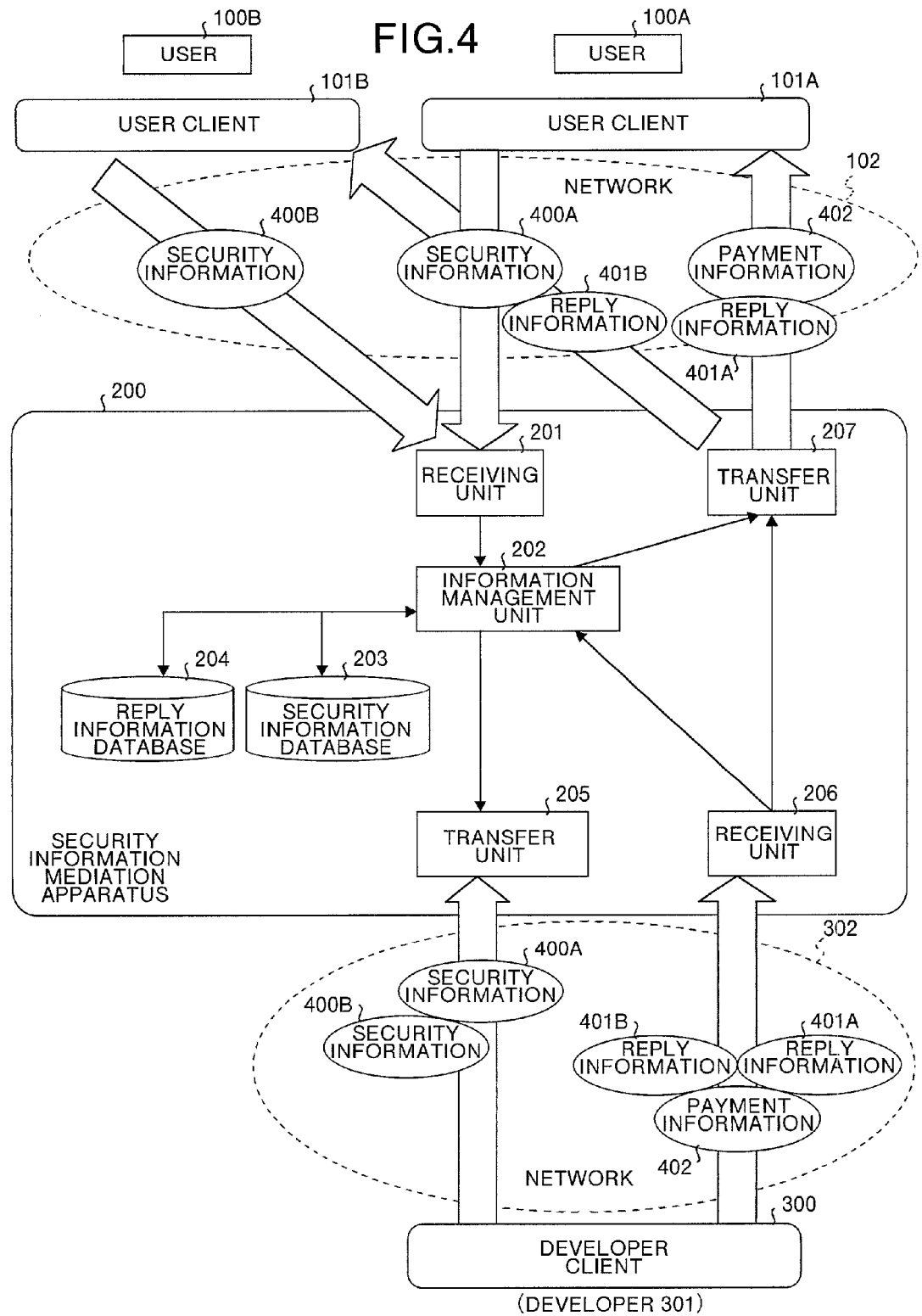

FIG.5A

400A ; SECURITY INFORMATION

| REGISTERING PERSON | CONTENT OF SECURITY INFORMATION |
|---|---|
| USER 100A | BUG PROBLEM QA OF SOFTWARE X |

FIG.5B

400B ; SECURITY INFORMATION

| REGISTERING PERSON | CONTENT OF SECURITY INFORMATION |
|---|---|
| USER 100B | BUG PROBLEM QB OF SOFTWARE X |

FIG.5C

401A ; REPLY INFORMATION

| REPLYING PERSON | JUDGING RESULT | REGISTERING PERSON | CONTENT OF SECURITY INFORMATION |
|---|---|---|---|
| DEVELOPER 301 | VALID | USER 100A | BUG PROBLEM QA OF SOFTWARE X |

FIG.5D

401B ; REPLY INFORMATION

| REPLYING PERSON | JUDGING RESULT | REGISTERING PERSON | CONTENT OF SECURITY INFORMATION |
|---|---|---|---|
| DEVELOPER 301 | INVALID | USER 100B | BUG PROBLEM QB OF SOFTWARE X |

FIG.5E

402 ; PAYMENT INFORMATION

| AMOUNT PAID | PAID TO | PAID BY | METHOD OF PAYMENT |
|---|---|---|---|
| 10000 YEN | USER 100A | DEVELOPER 301 | ELECTRONIC SETTLEMENT |

FIG.6A

203 ; SECURITY INFORMATION DATABASE

| REGISTRATION NO. | DATE OF REGISTRATION | REGISTERING PERSON | CONTENT OF SECURITY INFORMATION |
|---|---|---|---|
| 1 | 2000/4/27 18:00:13 | USER 100y | BUG PROBLEM OF SOFTWARE Y |
| 2 | 2000/5/13 14:32:10 | USER 100z | BUG PROBLEM OF SOFTWARE Z |
| 3 | 2000/6/11 19:26:30 | USER 100A | BUG PROBLEM QA OF SOFTWARE X |
| 4 | 2000/7/25 08:10:40 | USER 100B | BUG PROBLEM QB OF SOFTWARE X |

FIG.6B

204 ; SECURITY INFORMATION DATABASE

| REPLY NO. | DATE OF REPLY | REGISTRATION NO. | REPLYING PERSON | JUDGING RESULT |
|---|---|---|---|---|
| 1 | 2000/4/282 12:26:14 | 1 | DEVELOPER 301 | VALID |
| 2 | 000/5/1420 15:33:20 | 2 | DEVELOPER 301 | INVALID |
| 3 | 00/6/12 19:36:40 | 3 | DEVELOPER 301 | VALID |
| 4 | 2000/7/26 10:15:55 | 4 | DEVELOPER 301 | INVALID |

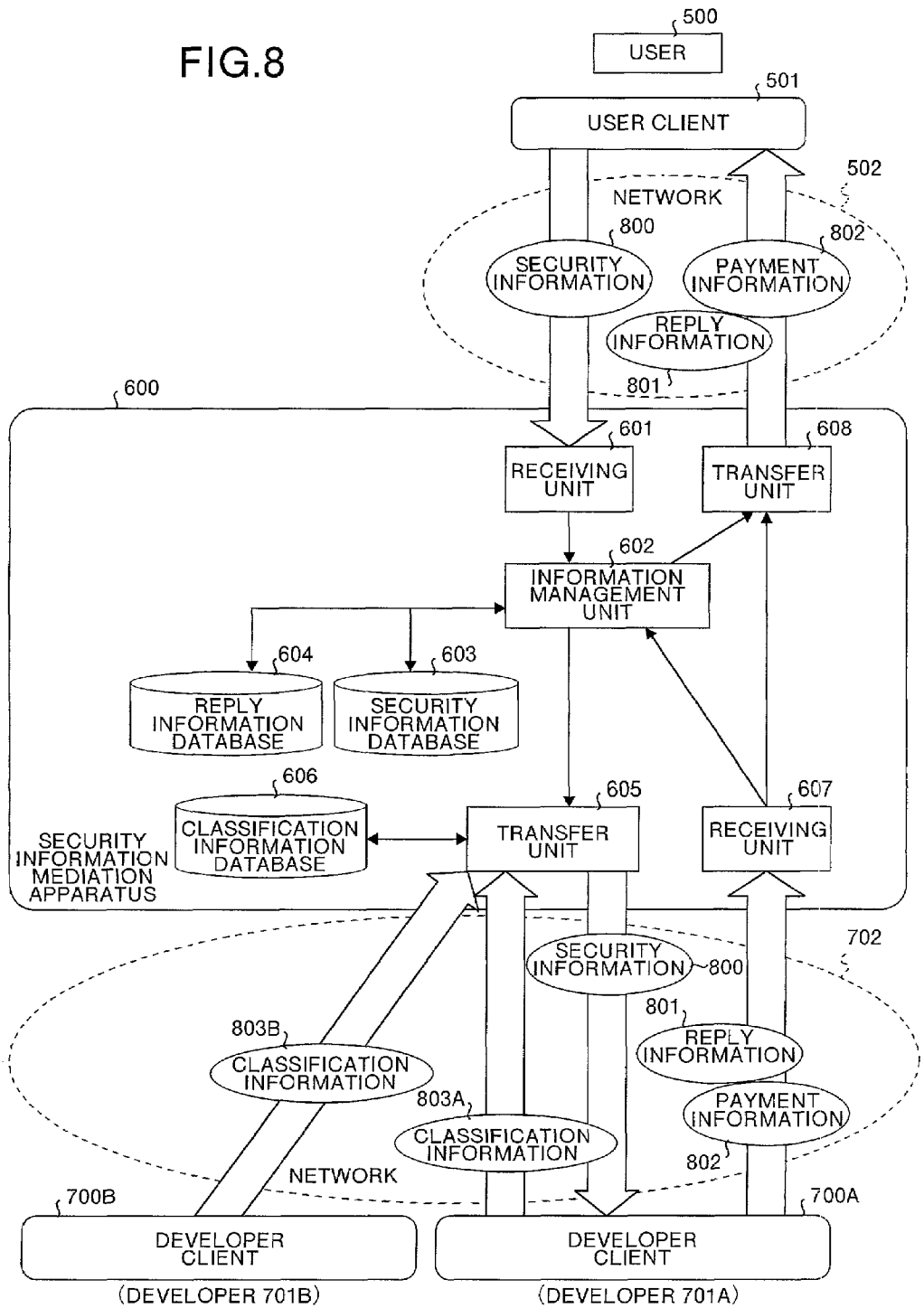

FIG.9A

800 ; SECURITY INFORMATION

| REGISTERING PERSON | CONTENT OF SECURITY INFORMATION |
|---|---|
| USER 500 | BUG PROBLEM OF SOFTWARE X |

FIG.9B

801 ; REPLY INFORMATION

| REPLYING PERSON | JUDGING RESULT | REGISTERING PERSON | CLASSIFICATION | CONTENT OF SECURITY INFORMATION |
|---|---|---|---|---|
| DEVELOPER 701A | VALID | USER 500 | A | BUG PROBLEM OF SOFTWARE X |

FIG.9C

802 ; REPLY INFORMATION

| AMOUNT PAID | PAID TO | PAID BY | METHOD OF PAYMENT |
|---|---|---|---|
| 10000YEN | USER 500 | DEVELOPER 701A | ELECTRONIC SETTLEMENT |

FIG.9D

803A ; CLASSIFICATION INFORMATION

| DEVELOPER | CLASSIFICATION |
|---|---|
| DEVELOPER 701A | A |

FIG.9E

803B ; CLASSIFICATION INFORMATION

| DEVELOPER | CLASSIFICATION |
|---|---|
| DEVELOPER 701B | B |

FIG.10A

603 : SECURITY INFORMATION DATABASE

| REGISTRATION NO. | DATE OF REGISTRATION | REGISTERING PERSON | CLASSIFICATION | CONTENT OF SECURITY INFORMATION |
|---|---|---|---|---|
| 1 | 2000/4/27 18:00:13 | USER Y | B | BUG PROBLEM OF SOFTWARE Y |
| 2 | 2000/5/13 14:32:10 | USER Z | B | BUG PROBLEM OF SOFTWARE Z |
| 3 | 2000/6/11 19:26:30 | USER 500 | A | BUG PROBLEM QA OF SOFTWARE X |

FIG.10B

604 : SECURITY INFORMATION DATABASE

| REPLY NO. | DATE OF REPLY | REGISTRATION NO. | REPLYING PERSON | CLASSIFICATION | JUDGING RESULT |
|---|---|---|---|---|---|
| 1 | 2000/4/28 12:26:14 | 1 | DEVELOPER 701B | B | VALID |
| 2 | 2000/5/14 15:33:20 | 2 | DEVELOPER 701B | B | INVALID |
| 3 | 2000/6/12 19:36:40 | 3 | DEVELOPER 701A | A | VALID |

FIG.10C

606 : CLASSIFICATION INFORMATION DATABASE

| DEVELOPER | REGISTRATION NO. |
|---|---|
| DEVELOPER 701A | A |
| DEVELOPER 701B | B |

FIG.13A

1002 ; REPLY INFORMATION DATABASE

| REPLY NO. | DATE OF REPLY | REGISTRATION NO. | REPLYING PERSON | CLASSIFICATION | JUDGING RESULT | CORRECTING METHOD |
|---|---|---|---|---|---|---|
| 1 | 2000/4/28 12:26:14 | 1 | DEVELOPER 701B | B | VALID | PATCH |
| 2 | 2000/5/14 15:33:20 | 2 | DEVELOPER 701B | B | INVALID | / |
| 3 | 2000/6/12 19:36:40 | 3 | DEVELOPER 701A | A | VALID | PATCH |

FIG.13B

1004 ; DISCLOSED INFORMATION DATABASE

| REPLY NO. | CLASSIFICATION | CONTENT OF SECURITY INFORMATION | REPLYING PERSON | CORRECTING METHOD | SECURITY INFORMATION POINTER | PATCH INFORMATION POINTER |
|---|---|---|---|---|---|---|
| 3 | | BUG PROBLEM OF SOFTWARE X | DEVELOPER 701A | PATCH | PS3 | PP3 |

FIG.13C

1100 ; PATCH INFORMATION

| REPLY NO. | REPLYING PERSON | | PATCH PROGRAM |
|---|---|---|---|
| 3 | DEVELOPER 701A | / | |

FIG.14

1200 ; INFORMATION DISCLOSURE SCREEN

AT THE PRESENT, THE FOLLOWING SECURITY INFORMATION IS DISCLOSED.

| REPLY NO. | CLASSIFICATION | CONTENT OF SECURITY INFORMATION | REPLYING PERSON | CORRECTING METHOD |
|---|---|---|---|---|
| | | | | |
| 3 | A | BUG PROBLEM OF SOFTWARE X | DEVELOPER 701A | PATCH |
| | | | | |

PLEASE SELECT SECURITY INFORMATION BY REPLY NO.
TRANSMISSION STARTS.
REPLY NO.: 3

1201
END

METHOD AND APPARATUS FOR MEDIATION OF SECURITY INFORMATION, AND A COMPUTER PRODUCT

FIELD OF THE INVENTION

The present information relates to a technology for mediation of security information about security hole between the computer program developer (vendor) and users.

BACKGROUND OF THE INVENTION

Recently, information exchange and information disclosure about security information of computer programs are operated on a global scale through the Internet, by CERT, other volunteer organizations, and private enterprises. Herein, the security information refers to the information about security hole which may cause security measure problems due to design errors and bugs of computer programs.

At the present, however, a good-willed user discovering a security hole may be mistaken for a perilous hacker, or may be involved in troubles with computer program developer, and the present environment is far from safe for exchanging and disclosing security information openly by anyone. This is contrary to the stream of open system represented by the Internet, and may impede development of computer programs commonly shared by the mankind. In such background, means and methods for solving these problems effectively have been desired.

The computer program developer attempts to wipe out design errors, bugs and other security holes thoroughly in the test stage, and present a sound computer program to users. Actually, however, it is extremely difficult to discover all security holes in the test stage, and users often finds security holes not detected by the developer only after starting to use the computer program.

Users finding security holes may present detailed information about security holes as security information, either directly to the developer, or at the security information site on the Internet. In such a case, the developer, when judging that the presented security information is useful, takes measures by presenting a patch program for correction or the security information to the users.

In the existing environment, the security information is presented from users to the developer, either directly or through the security information site on the Internet. Hitherto, however, good-willed users presenting the security information are often accused as perilous hackers, or involved in troubles with the developer not willing to disclose the presence of security holes.

Therefore, in the present situation, users having useful security information often hesitate to present the security information in order to avoid such accusation and troubles. Such environment impedes improvement of quality of computer program, and is not beneficial for both developers and users.

For the developers, on the other hand, it is difficult to collect security information dispersed on the Internet efficiently, and it may take tremendous labor and cost to sort out only useful information from the security information varied very much in quality. It has been attempted to classify the dispersed security information, but successful results are not obtained. At last, the developer are forced to follow the conventional technique of collecting massive amount of security information and sorting out useful information only.

The invention is devised in the light of such background, and it is hence an object thereof to present a security information mediation apparatus capable of organizing an environment easy for users to present security information, and allowing the developers to collect useful security information at low cost, and its security information mediation method, and a computer-readable recording medium recording a security information mediation program.

SUMMARY OF THE INVENTION

It is an object of the present invention to provide a method and an apparatus capable of organizing an environment easy for users to present security information, and allowing the developers to collect useful security information at low cost. It is another object of this invention to provide a computer readable recording medium that stores a computer program which when executed realizes the method according to the present invention.

The security information mediation apparatus according to one aspect of the present invention comprises a registering unit for registering security information presented from the information contributor's terminal, a first transfer unit for transferring the security information registered by the registering unit to the information recipient's terminal for judging the usefulness of the security information, a receiving unit for receiving the reply information showing the usefulness of the security information and the payment information about payment of the information presentation fee of the corresponding security information from the information recipient's terminal, and a second transfer unit for transferring the reply information and payment information to the information contributor's terminal.

When the security information is presented from the information contributor (user), the security information is registered by the registering unit. As a result, the first transfer unit transfers the security information to the information recipient's terminal (for example, the terminal of the computer program developer), and the usefulness of the security information is judged by the information recipient. Herein, when the security information is judged to be useful, the reply information and payment information are transmitted from the information recipient's terminal.

Consequently, when the reply information and payment information are received by the receiving unit, the second transfer unit transfers the reply information and payment information to the information contributor's terminal. As a result, the information contributor understands that the presented security information was useful, and recognizes payment for presentation of security information.

Thus, the security information from the information contributor is directly presented to the information recipient side, and reward is paid to the user presenting useful security information, and therefore it is easier for the information contributor (user) to present security information, while the information recipient (for example, developer) can collect useful security information at low cost.

The security information mediation method according to another aspect of the present invention comprises a registering step of registering security information presented from the information contributor's terminal, a first transfer step of transferring the security information registered at the registering step to the information recipient's terminal for judging the usefulness of the security information, a receiving step of receiving the reply information showing the usefulness of the security information and the payment information about payment of the information presentation fee of the corresponding security information from the information recipient's terminal, and a second transfer step of transferring the reply information and payment information to the information contributor's terminal.

When the security information is presented from the information contributor (user), the security information is registered at the registering step. As a result, the first transfer step transfers the security information to the information recipient's terminal (for example, the terminal of the computer program developer), and the usefulness of the security information is judged by the information recipient. Herein, when the security information is judged to be useful, the reply information and payment information are transmitted from the information recipient's terminal.

Consequently, when the reply information and payment information are received at the receiving step, the second transfer step transfers the reply information and payment information to the information contributor's terminal. As a result, the information contributor understands that the presented security information was useful, and recognizes payment for presentation of security information.

Thus, the security information from the information contributor is directly presented to the information recipient side, and reward is paid to the user presenting useful security information, and therefore it is easier for the information contributor (user) to present security information, while the information recipient (for example, developer) can collect useful security information at low cost.

Other objects and features of this invention will become apparent from the following description with reference to the accompanying drawings.

BRIEF DESCRIPTION OF THE DRAWINGS

FIG. 1 is a block diagram showing a configuration of a first embodiment of the invention.

FIG. 2A shows the security information 40, FIG. 2B shows the reply information 41A, FIG. 2C shows the reply information 41B, and FIG. 2D shows the payment information 42 shown in FIG. 1.

FIG. 4 is a block diagram showing a configuration of a second embodiment of the invention.

FIG. 5A shows the security information 400A, FIG. 5B shows the security information 400B, FIG. 5C shows the reply information 401A, FIG. 5D shows the reply information 401B, and FIG. 5E shows the payment information 402 shown in FIG. 4.

FIG. 6A shows the data structure of the security information database 203, and FIG. 6B shows the data structure of the reply information database 204 shown in FIG. 4.

FIG. 8 is a block diagram showing a configuration of a third embodiment of the invention.

FIG. 9A shows the security information 800, FIG. 9B shows the reply information 801, FIG. 9C shows the payment information 802, FIG. 9D shows the classification information 803A, and FIG. 9E shows the classification information 803B shown in FIG. 8.

FIG. 10A shows a data structure of the security information database 603, FIG. 10B shows a data structure of the reply information database 604, and FIG. 10C shows a data structure of the classification information database 606 shown in FIG. 8.

FIG. 13A shows a data structure of the reply information database 1002, FIG. 13B shows a data structure of the disclosed information database 1004, and FIG. 13C shows the patch information 1100 shown in FIG. 12.

FIG. 14 is a diagram showing an example of information disclosure screen 1200 in the fourth embodiment.

DESCRIPTION OF THE PREFERRED EMBODIMENTS

Figure 3:
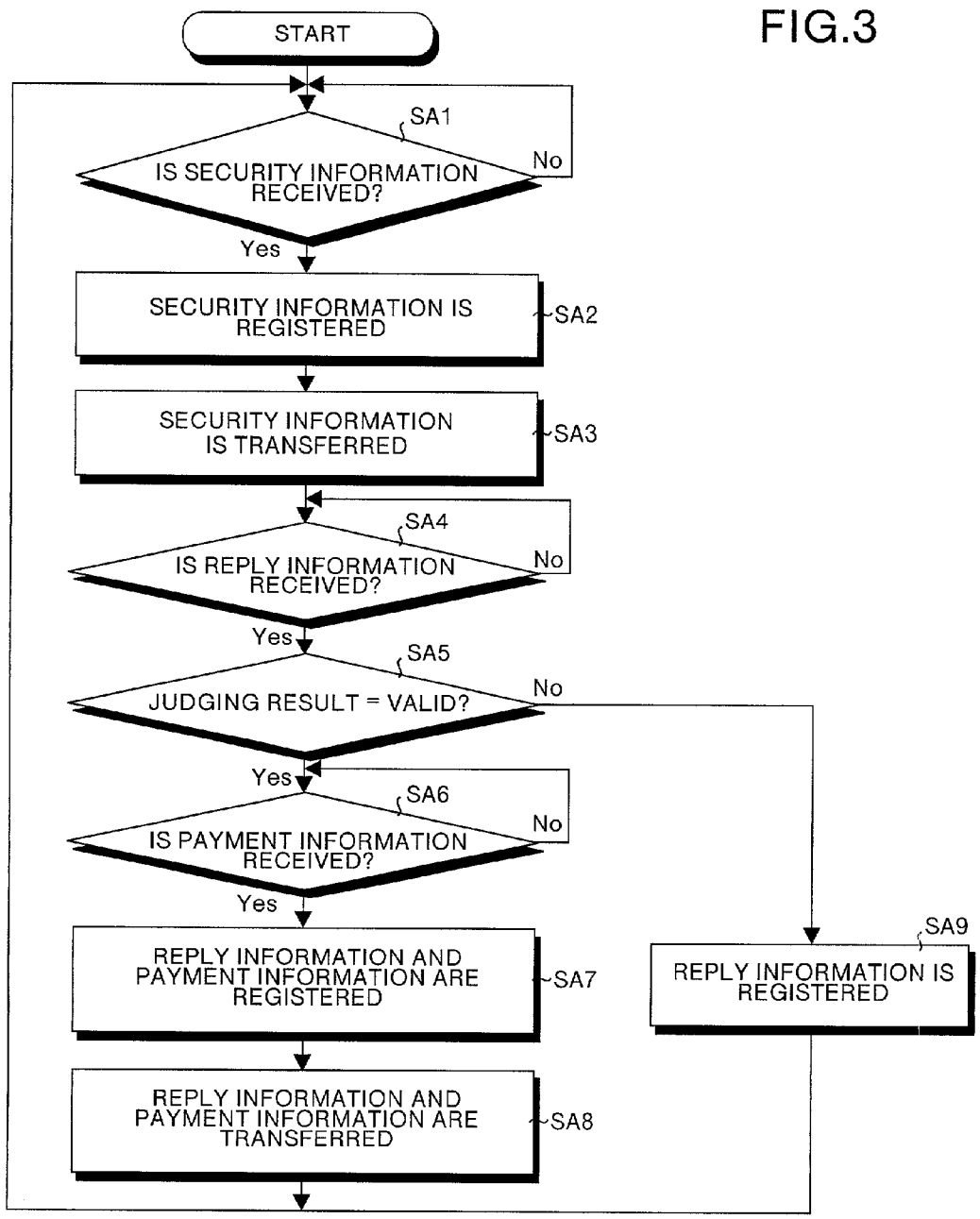
FIG. 3 is a flowchart for explaining the operation in the first embodiment.

Four preferred embodiments of the security information mediation apparatus, security information mediation method, and computer-readable recording medium recording a security information mediation program of the invention are explained in detail below with reference to the attached drawings.

FIG. 1 is a block diagram showing a configuration of a first embodiment of the invention. As shown in this figure, a user client 11 is a computer terminal operated by a user 10, and is accessible to a security information mediation apparatus 20 through a network 12. The user 10 is a person using various computer programs developed by developer 31A and developer 31B mentioned below, and other developers. The user 10 is also a learned person having enough knowledge for discovering bugs and security holes of computer programs, and presenting them as security information.

The user client 11 has a function of registering security information 40 in the security information mediation apparatus 20 through the network 12, and a function of receiving reply information 41A and payment information 42 from the security information mediation apparatus 20 when the security information 40 is useful. This security information 40 is the information presented to the developer of the computer program if the user 10 discovers a security hole in the computer program.

Specifically, the security information 40 shown in FIG. 2A is composed of "registering person" (user 10) and "content of security information" (bug problem of software X). The "registering person" is the information showing the person who has registered the security information, and the "content of security information" is the information showing the specific content of the security information.

The reply information 41A is the information replied from the developer to the user 10 in the case the security information 40 is judged to be valid by the developer. Specifically, the reply information 41A shown in FIG. 2B is composed of "replying person" (developer 31A), "judging result" (valid), "registering person" (user 10), and "content of security information" (bug problem of software X).

The "replying person" is the information showing the developer replying to the security information registered in the security information mediation apparatus 20, and the "judging result" is the information showing whether the security information is valid or not. The "registering person" is the information showing the person who has registered the security information, and the "content of security information" is the information showing the specific content of the security information.

The payment information 42 is the information about the amount of money to be paid from the developer 31A to the user 10 as the reward for presenting the security information 40 when the security information 40 is judged to be valid at the developer 31A side, and the method of payment. Specifically, the payment information 42 shown in FIG. 2D is composed of "amount paid" (10000 yen), "paid to" (user 10), "paid by" (developer 31A), and "paying method" (electronic settlement).

The "amount paid" is the information about the amount to be paid from the developer 31A to the user 10 as the reward for presentation of the security information 40. The "paid to" is the information showing to whom the amount is paid. The "paid by" is the information showing who is to pay the amount. The "paying method" is the information showing the method of payment of the amount to the user. In the first embodiment, the "paying method" is electronic settlement, but other method of payment is also possible such as transfer to bank account.

The security information mediation apparatus 20 is a server mediating security information between the user 10 and developers 31A and 31B, and is interposed between the network 12 and network 32. The security information mediation apparatus 20 is accessed by the user client 11 and developer clients 30A and 30B.

In the security information mediation apparatus 20, a security information registering unit 21 has a function of registering the security information 40 from the user client 11 into a security information database 22. Actually, aside from the user client 11, multiple user clients are connected to the network 12. Therefore, the security information registering unit 21 also has a function of registering the security information from other user clients into the security information database 22.

A transfer unit 23 has a function of transferring the security information registered by the security information registering unit 21 to the developer clients 30A and 30B through the network 32. The network 32 is for connecting the security information mediation apparatus 20 and the developer clients 30A and 30B. The developer client 30A is a computer terminal installed at the side of the developer 31A, that is, the vendor of the computer program. The developer client 30B is a computer terminal installed at the side of the developer 31B, that is, the vendor of the computer program.

The developer client 30A receives the security information 40 from the transfer unit 32, and transmits the reply information 41A (see FIG. 2B) and payment information 42 (see FIG. 2D) to the security information mediation apparatus 20. Similarly, the developer client 30B receives the security information 40 from the transfer unit 23, and transmits the reply information 41B to the security information mediation apparatus 20.

In the shown example, payment information is not transmitted from the developer client 30B. This is because the security information 40 is invalid for the developer 31B, and payment as reward does not arise. That is, the "judging result" of reply information 41A (see FIG. 2B) is valid, while the "judging result" of the reply information 41B (see FIG. 2C) is invalid. In this case, the "replying person" of reply information 41B is the developer 31B.

In the security information mediation apparatus 20, a reply information registering unit 24 has a function of registering reply information 41A, payment information 42, and reply information 41B sent from the developer client 30A and developer client 30B through the network 32 into the reply information database 25. A transfer unit 26 has a function of transferring the reply information judged to be valid of the reply information registered in the reply information registering unit 24 (reply information 41A in the shown example), and payment information about the reply information (payment information 42 in this example) to the corresponding user client (user client 11 in the example) through the network 12.

The operation of the first embodiment is explained below by referring to the flowchart in FIG. 3. At step SA1 in the diagram, the security information registering unit 21 judges if the security information is received from the user client 11 or not, and in this case it is judged No. Herein, the user 10 discovering a bug (security hole) in software X creates security information 40 shown in FIG. 2A with the aid of the user client 11. By the operation by the user 10, the security information 40 is transmitted from the user client 11 to the security information mediation apparatus 20.

Receiving this security information 40, the security information registering unit 21 judges Yes at step SA1. At step SA2, the security information registering unit 21 registers the security information 40 in the security information database 22. At step SA3, the security information registering unit 21 transfers the security information 40 to the transfer unit 23. As a result, the transfer unit 23 transfers the security information 40 parallel to the developer clients 30A and 30B. At step SA4, the reply information registering unit 24 judges if the reply information is received or not, and in this case it is judged No.

When the security information 40 is received by the developer clients 30A and 30B, the developers 31A and 31B individually judge if the security information 40 is valid information or not. Herein, the security information 40 is "valid" when it is judged to contribute to upgrading of the software X and be worth paying due amount to the user 10 as the reward for presentation.

In this case, suppose the developer 31A judges the security information 40 to be valid. At the developer 31A, using the developer client 30A, the reply information 41A (see FIG. 2B) and payment information 42 (see FIG. 2D) are created, and they are sent to the security information mediation apparatus 20. The reply information 41A and payment information 42 are received in the reply information registering unit 24 of the security information mediation apparatus 20 through the network 32.

As a result, the reply information registering unit 24 judges Yes at step SA4. At step SA5, the reply information registering unit 24 judges if the result of judgment of the reply information 41A shown in FIG. 2B is valid or not, and it is judged Yes herein. At step SA6, the reply information registering unit 24 judges if the payment information corresponding to the received reply information 41A is received or not, and it is judged Yes in this case. If judged No at step SA6, the reply information registering unit 24 repeats the same judgment.

At step SA7, the reply information registering unit 24 registers the reply information 41A and payment information 42 in the replay information database 25. At step SA8, the reply information registering unit 24 transfers the reply information 41A and payment information 42 to the transfer unit 26. As a result, the transfer unit 26 transfers the reply information 41A and payment information 42 to the user client 11 through the network 12.

When the reply information 41A and payment information 42 are received in the user client 11, the user client 11 informs the user 10 of the reply information 41A and payment information 42. As a result, the user 10 understands that the security information 40 the user has presented was useful, and recognizes that 10000 yen is paid from the developer 31A by electronic settlement.

On the other hand, suppose the developer 31B had judged the security information 40 invalid. Being "invalid" means that the software X in question is indifferent to the developer 31B, and it is not worth paying due amount to the user as reward for presentation. In this case, at the developer 31B, using the developer client 30B, invalidity reply information 41B (see FIG. 2C) is created, and transmitted to the security information mediation apparatus 20. This reply information 41B is received in the reply information registering unit 24 of the security information mediation apparatus 20 through the network 32.

As a result, the reply information registering unit 24 judges Yes at step SA4. At step SA5, the reply information registering unit 24 judges if the result of judgment of the reply information 41B shown in FIG. 2C is valid or not, and it is judged No in this case. At step SA9, the reply information 41B is registered in the reply information database 25.

As explained herein, according to the first embodiment, the security information 40 from the user 10 is directly presented to the developer 31A and developer 31B, and reward is paid to the user presenting useful security information, and therefore the environment is easy for the user 10 to present security information, while the developer 31A and developer 31B can collect useful security information at low cost.

FIG. 4 is a block diagram showing a configuration of a second embodiment of the invention. As shown in this figure, a user client 101A is a computer terminal operated by a user 100A, and is accessible to a security information mediation apparatus 200 through a network 102. The user 100A is a person using various computer programs developed by developer 301 mentioned below, and other developers. The user 100A is also a learned person having enough knowledge for discovering bugs and security holes of computer programs, and presenting them as security information.

The user client 101A, same as the user client 11 (see FIG. 1), has a function of registering security information 400A in the security information mediation apparatus 200 through the network 102, and a function of receiving (in the diagram, reply information 401A and payment information 402) from the security information mediation apparatus 200.

This security information 400A is the information presented to the developer of the computer program if the user 100A discovers a security hole in the computer program, and it is composed same as the security information 40 (see FIG. 2A). Specifically, the security information 400A shown in FIG. 5A is composed of "registering person" (user 100A) and "content of security information" (bug problem QA of software X).

The reply information 401A, same as the reply information 41A (see FIG. 2B), is the information replied from the developer to the user 100A in the case the security information 400A is judged to be valid by the developer. Specifically, the reply information 401A shown in FIG. 5C is composed of "replying person" (developer 301), "judging result" (valid), "registering person" (user 100A), and "content of security information" (bug problem QA of software X).

The payment information 402, same as the payment information 42 (see FIG. 2D), is the information about the amount of money to be paid from the developer 301 to the user 100A as the reward for presenting the security information 400A when the security information 400A is judged to be valid at the developer 301 side, and the method of payment. Specifically, the payment information 402 shown in FIG. 5E is composed of "amount paid" (10000 yen), "paid to" (user 100A), "paid by" (developer 301), and "paying method" (electronic settlement).

On the other hand, a user client 101B is a computer terminal operated by a user 100B, and is accessible to the security information mediation apparatus 200 through the network 102. The user 100B, same as the user 100A, is a person using various computer programs developed by developer 301 mentioned below, and other developers. The user 100B is also a learned person having enough knowledge for discovering bugs and security holes of computer programs, and presenting them as security information.

The user client 101B, same as the user client 101A, has a function of registering security information 400B in the security information mediation apparatus 200 through the network 102, and a function of receiving (in the diagram, reply information 401B) from the security information mediation apparatus 200.

This security information 400B is the information presented to the developer of the computer program if the user 100B discovers a security hole in the computer program, and it is composed same as the security information 40 (see FIG. 2A). Specifically, the security information 400B shown in FIG. 5B is composed of "registering person" (user 100B) and "content of security information" (bug problem QB of software X).

The reply information 401B is the information replied from the developer to the user 100B in the case the security information 400B is judged to be invalid by the developer. Specifically, the reply information 401B shown in FIG. 5D is composed of "replying person" (developer 301), "judging result" (invalid), "registering person" (user 100B), and "content of security information" (bug problem QB of software X).

The security information mediation apparatus 200 is a server mediating security information between the users 100A and 100B and the developer 301, and is interposed between the network 102 and network 302. The security information mediation apparatus 200 is accessed by the user clients 101A and 101B and the developer client 300.

In the security information mediation apparatus 200, a receiving unit 201 has a function of receiving the security information 400A and 400B from the user clients 101A and 101B. An information management unit 202 has a function of managing the security information 400A and 400B received in the receiving unit 201, reply information 401A, 401B and payment information 402 received in a receiving unit 206 described below. The function of the information management unit 202 is explained later.

A transfer unit 205 has a function of transferring the security information registered by the information management unit 202 to the developer client 300 through the network 302. The network 302 is for connecting the security information mediation apparatus 200 and the developer client 300. The developer client 300 is a computer terminal installed at the side of the developer 301, that is, the vendor of the computer program.

The developer client 300 receives the security information 400A and 400B from the transfer unit 205, and transmits the reply information 401A (see FIG. 5C), reply information 401B (see FIG. 5D), and payment information 402 (see FIG. 5E) to the security information mediation apparatus 200.

In the shown example, payment information corresponding to the security information 400B is not transmitted from the developer client 300. This is because the security information 400B is invalid for the developer 301, and payment as reward does not arise. That is, the "judging result" of reply information 401A (see FIG. 5C) is valid, while the "judging result" of the reply information 401B (see FIG. 5D) is invalid. In this case, the "replying person" of both reply information 401A and 401B is the developer 301.

In the security information mediation apparatus 200, a receiving unit 206 has a function of receiving the reply information and payment information (in the diagram, reply information 401A, 401B, and payment information 402) transmitted from the developer client 300 through the network 302. The information management unit 202 has a function of registering the security information (in the diagram, security information 400A and 400B) received in the receiving unit 201 in the security information database 203 shown in FIG. 6A.

The security information database 203 is composed of "registration No." given in the order of registration of security information, "date of registration", "registering person", and "content of security information". In the diagram, a record of "registration No."=3 corresponds to the security information 400A (see FIG. 5A), and a record of "registration No."=4 corresponds to the security information 400B (see FIG. 5B).

The information management unit 202 also has a function of registering the reply information received in the receiving unit 206 (in the diagram, reply information 401A and 401B) in a reply information database 204 shown in FIG. 6B. This reply information database 204 is composed of "reply No." given in the order of registration of reply information, "date of reply", "registration No." (see FIG. 6A), "replying person", and "judging result". In the diagram, a record of "reply No."=3 corresponds to the reply information 401A (see FIG. 5C), and a record of "reply No."=4 corresponds to the reply information 401B (see FIG. 5D).

The information management unit 202 further transfers the reply information of which result of judgment is valid or invalid (in the diagram, reply information 401A and reply information 401B), and payment information (in the diagram, payment information 402) to a transfer unit 207. The transfer unit 207 has a function of transferring the reply information and payment information from the information management unit 202 to the corresponding user client through the network 102.

Figure 7:
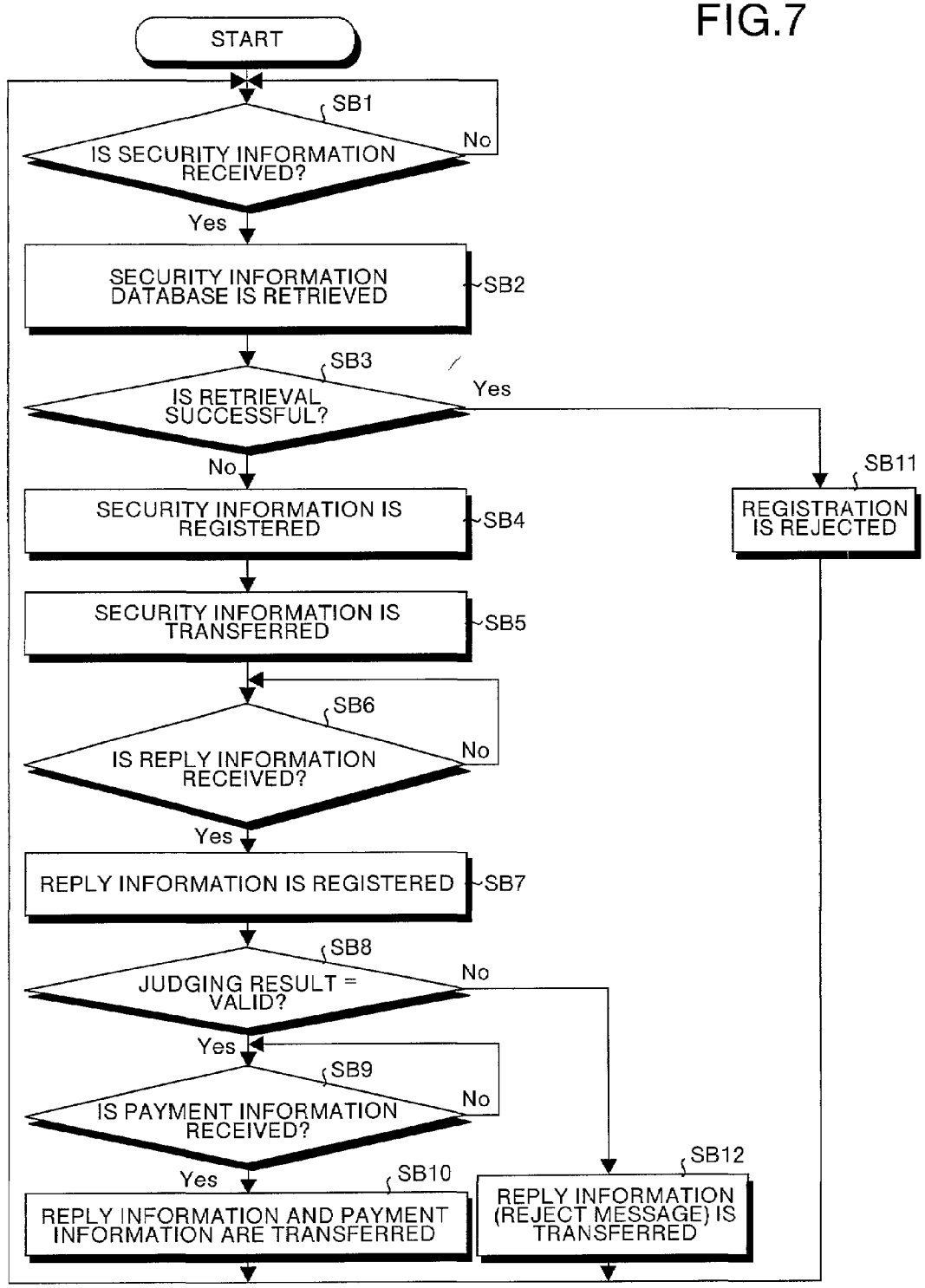
FIG. 7 is a flowchart for explaining the operation in the second embodiment.

The operation of the second embodiment is explained below by referring to the flowchart in FIG. 7. At step SB1 in the diagram, the information management unit 202 judges if the security information is received in the receiving unit 201 or not, and in this case it is judged No.

Herein, the user 100A discovering a bug (security hole) in software X creates security information 400A shown in FIG. 5A with the aid of the user client 101A. By the operation by the user 100A, the security information 400A is transmitted from the user client 101A to the security information mediation apparatus 200.

Receiving this security information 400A in the receiving unit 201, the information management unit 202 judges Yes at step SB1. At step SB2, the information management unit 202 retrieves the security information database 203 shown in FIG. 6A, using the "registering person" and "content of security information" of the security information 400A as the key. In this case, suppose only records of "registration No."=1 and 2 are present in the security information database 203.

At step SB3, the information management unit 202 judges if the retrieval is successful or not, that is, whether the same content as the security information 400A is registered in the security information database 203 or not, and if judged Yes, at step SB11, the information management unit 202 rejects registration. In this case, the information management unit 202 judges No at step SB3.

At step SB4, the information management unit 202 registers the security information 400A in the security information database 203 (see FIG. 6A). As a result, in the security information database 203, a record of "registration No."=3 (corresponding to security information 400A) is added.

At step SB5, the information management unit 202 transfers the security information 400A to the transfer unit 205. The transfer unit 205 transfers the security information 400A to the developer client 300 through the network 302. At step SB6, the information management unit 202 judges if the reply information is received in the receiving unit 206 or not, and it is judged No in this case.

When the security information 400A is received by the developer client 300, the developers 301 judges if the security information 400A is valid information or not. In this case, suppose the developer 301 judges the security information 400A to be valid. At the developer 301, using the developer client 300, the reply information 401A (see FIG. 5C) and payment information 402 (see FIG. 5E) are created, and they are sent to the security information mediation apparatus 200. The reply information 401A and payment information 402 are received in the receiving unit 206 of the security information mediation apparatus 200 through the network 302.

As a result, the information management unit 202 judges Yes at step SB6. At step SB7, the information management unit 202 registers the reply information 401A in the reply information database 204 (see FIG. 6B). Consequently, a record of "reply No."=3 (corresponding to the reply information 401A) is added to the reply information database 204.

At step SB8, the information management unit 202 judges if the result of judgment of the reply information 401A shown in FIG. 5C is valid or not, and it is judged Yes herein. At step SB9, the information management unit 202 judges if the payment information 402 corresponding to the reply information 401A is received in the receiving unit 206 or not, and it is judged Yes in this case. If judged No at step SB9, the information management unit 202 repeats the same judgment.

At step SB10, the information management unit 202 transfers the reply information 401A and payment information 402 to the transfer unit 207. As a result, the transfer unit 207 transfers the reply information 401A and payment information 402 to the user client 101A through the network 102.

When the reply information 401A and payment information 402 are received in the user client 101A, the user client 101A informs the user 100A of the reply information 401A and payment information 402. As a result, the user 100A understands that the security information 400A the user has presented was useful, and recognizes that 10000 yen is paid from the developer 301 by electronic settlement.

On the other hand, the user 100B discovering a bug (security hole) in software X creates security information 400B shown in FIG. 5B with the aid of the user client 101B. By the operation by the user 100B, the security information 400B is transmitted from the user client 101B to the security information mediation apparatus 200.

Receiving this security information 400B in the receiving unit 201, the information management unit 202 judges Yes at step SB1. At step SB2, the information management unit 202 retrieves the security information database 203, using the "registering person" and "content of security information" of the security information 400B as the key. In this case, suppose only records of "registration No."=1 to 3 are present in the security information database 203.

At step SB3, the information management unit 202 judges if the retrieval is successful or not, and it is judged No. At step SB4, the information management unit 202 registers the security information 400B in the security information database 203 (see FIG. 6A). As a result, in the security information database 203, a record of "registration No."=4 (corresponding to security information 400B) is added.

At step SB5, the information management unit 202 transfers the security information 400B to the transfer unit 205. The transfer unit 205 transfers the security information 400B to the developer client 300 through the network 302. At step SB6, the information management unit 202 judges if the reply information is received in the receiving unit 206 or not, and it is judged No in this case.

When the security information 400B is received by the developer client 300, the developers 301 judges if the security information 400B is valid information or not. In this case, suppose the developer 301 judges the security information 400B to be invalid. At the developer 301, using the developer client 300, the reply information 401B as the reject message (see FIG. 5D) is created, and sent to the security information mediation apparatus 200.

The reply information 401B is received in the receiving unit 206 of the security information mediation apparatus 200 through the network 302. As a result, the information management unit 202 judges Yes at step SB6. At step SB7, the information management unit 202 registers the reply information 401B in the reply information database 204 (see FIG. 6B). Consequently, a record of "reply No."=4 (corresponding to the reply information 401B) is added to the reply information database 204.

At step SB8, the information management unit 202 judges if the result of judgment of the reply information 401B shown in FIG. 5D is valid or not, and it is judged No herein. At step SB12, the information management unit 202 transfers the reply information 401B as reject message to the transfer unit 207. As a result, the transfer unit 207 transfers the reply information 401B to the user client 101B through the network 102. When the reply information 401B is received in the user client 101B, the user client 101B informs the user 100B of the reply information 401B. As a result, the user 100B understands that the security information 400B the user has presented was invalid.

As explained herein, according to the second embodiment, since the reply information 401B showing invalidity of the security information 400B presented from the user 100B is transferred to the user client 101B, it is effective to improve the service for the user interested in the manner of use (valid or invalid) of the presented security information.

Further, only when the security information (security information 400A, 400B) presented from the users (user 100A, user 100B) is new, such security information is transferred to the developer client 300, and hence it saves the wasteful time of transferring unnecessary security information to the developer client 300, so that the security information may be collected efficiently.

FIG. 8 is a block diagram showing a configuration of a third embodiment of the invention. As shown in this figure, a user client 501 is a computer terminal operated by a user 500, and is accessible to a security information mediation apparatus 600 through a network 502.

The user 500 is a person using various computer programs developed by developers 7011A and 701B mentioned below, and other developers. The user 500 is also a learned person having enough knowledge for discovering bugs and security holes of computer programs, and presenting them as security information.

The user client 501, same as the user client 11 (see FIG. 1), has a function of registering security information 800 in the security information mediation apparatus 600 through the network 502, and a function of receiving information (in the diagram, reply information 801 and payment information 802) from the security information mediation apparatus 600.

The security information 800 is the information to be presented to the developer of the computer program if the user 500 discovers a security hole in the computer program, and it is composed same as the security information 40 (see FIG. 2A). Specifically, the security information 800 shown in FIG. 9A is composed of "registering person" (user 500) and "content of security information" (bug problem of software X).

The reply information 801, same as the reply information 41A (see FIG. 2B), is the information replied from the developer to the user 500 in the case the security information 800 is judged to be valid by the developer. Specifically, the reply information 801 shown in FIG. 9B is composed of "replying person" (developer 701A), "judging result" (valid), "registering person" (user 500), "classification" (A) and "content of security information" (bug problem of software X). Herein, "classification" is the information showing the corresponding classification item of the content of the security information.

The payment information 802, same as the payment information 42 (see FIG. 2D), is the information about the amount of money to be paid from the developer 701A to the user 500 as the reward for presenting the security information 800 when the security information 800 is judged to be valid at the developer 701A side, and the method of payment. Specifically, the payment information 802 shown in FIG. 9C is composed of "amount paid" (10000 yen), "paid to" (user 500), "paid by" (developer 701A), and "paying method" (electronic settlement).

The security information mediation apparatus 600 is a server mediating security information between the user 500 and developers 701A and 701B, and is interposed between the network 502 and network 702. The security information mediation apparatus 600 is accessed by the user client 501 and developer clients 700A and 700B.

In the security information mediation apparatus 600, a receiving unit 601 has a function of receiving the security information 800 from the user client 501. An information management unit 602 has a function of managing the security information 800 received in the receiving unit 601, reply information 801 and payment information 802 received in a receiving unit 607 described below. The function of the information management unit 602 is explained later.

A transfer unit 605 has a function of transferring the security information registered by the information management unit 602 to the developer clients 700A and 700B through the network 702. The transfer unit 605 also has a function of receiving the classification information 803A and 803B from the developer clients 700A and 700B, and registering them in the classification information database 606.

The classification information 803A is the information showing the classification of security information required at the developer 701A. Specifically, the classification information 803A shown in FIG. 9D is composed of "developer" (developer 701A) and "classification" (A). Therefore, the developer 701A requires only the security information belonging to classification A, and does not require security information belonging to other classification. In other words, the classification information 803A is filtering information for extracting security information required at the developer 701A, out of a multiplicity of security information registered in the security information mediation apparatus 600.

On the other hand, the classification information 803B, like the classification information 803A, is the information showing the classification of security information required at the developer 701B. Specifically, the classification information 803B shown in FIG. 9E is composed of "developer" (developer 701B) and "classification" (B).

Therefore, the developer 701B requires only the security information belonging to classification B, and does not require security information belonging to other classification. Thus, same as the classification information 803A, the classification information 803B is also filtering information for extracting security information required at the developer 701B, out of a multiplicity of security information registered in the security information mediation apparatus 600.

The classification information database 606 is, as shown in FIG. 10C, composed of "developer" and "classification". In this classification information database 606, the record of "developer" (=developer 701A) corresponds to the classification information 803A (see FIG. 9D), and the record of "developer" (=developer 701B) corresponds to the classification information 803B (see FIG. 9E).

The network 702 is for connecting the security information mediation apparatus 600 and the developer clients 700A and 700B. The developer client 700A is a computer terminal installed at the side of the developer 701A, that is, the vendor of the computer program. The developer client 700B is a computer terminal installed at the side of the developer 701B, that is, the vendor of the computer program.

The developer client 700A transmits the classification information 803A (see FIG. 9D) to the transfer unit 605, and receives the security information (in the diagram, security information 800) corresponding to the classification information 803A. Also, when the security information is valid, the developer client 700A transmits the reply information 801 (see FIG. 9B) and payment information 802 (see FIG. 9C) to the security information mediation apparatus 600.

On the other hand, the developer client 700B transmits the classification information 803B (see FIG. 9E) to the transfer unit 605, and receives the security information corresponding to the classification information 803B. Also, when the security information is valid, same as the developer client 700A, the developer client 700B transmits the reply information and payment information to the security information mediation apparatus 600.

In the security information mediation apparatus 600, the receiving unit 607 has a function of receiving the reply information and payment information (in the diagram, reply information 801 and payment information 802) transmitted from the developer clients 700A, 700B through the network 702. The information management unit 602 has a function of registering the security information (in the diagram, security information 800) received in the receiving unit 601 in the security information database 603 shown in FIG. 10A.

The security information database 603 is composed of "registration No." given in the order of registration of security information, "date of registration", "registering person", "classification" showing the classification of security information, and "content of security information". In the diagram, a record of "registration No."=3 corresponds to the security information 800 (see FIG. 9A).

The information management unit 602 also has a function of registering the reply information (in the diagram, reply information 801) received in the receiving unit 607 in a reply information database 604 shown in FIG. 10B. This reply information database 604 is composed of "reply No." given in the order of registration of reply information, "date of reply", "registration No." (see FIG. 10A), "replying person", "classification" (see FIG. 10A), and "judging result". In the diagram, a record of "reply No."=3 corresponds to the reply information 801 (see FIG. 9B).

The information management unit 602 further transfers the reply information of which result of judgment is valid or invalid (in the diagram, reply information 801), and payment information (in the diagram, payment information 802) to a transfer unit 608. The transfer unit 608 has a function of transferring the reply information and payment information from the information management unit 602 to the corresponding user client through the network 502.

Figure 11:
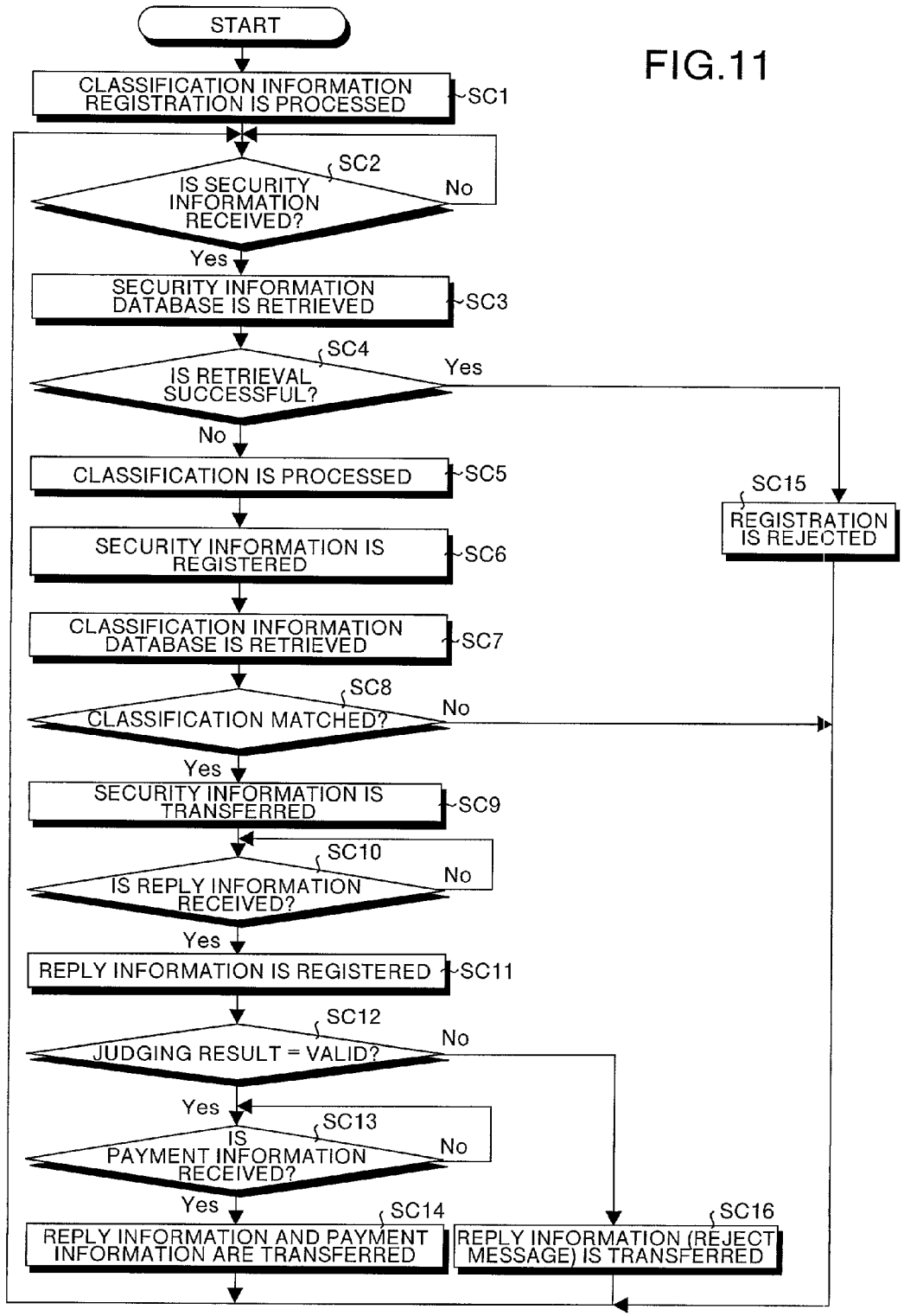
FIG. 11 is a flowchart for explaining the operation in the third embodiment.

The operation of the third embodiment is explained below by referring to the flowchart in FIG. 11. At step SC1 in the diagram, the transfer unit 605 executes classification registration process. Specifically, the transfer unit 605 receives the classification information 803A (see FIG. 9D) and classification information 803B (see FIG. 9E) from the developer clients 700A and 700B through the network 702, and registers them in the classification information database 606 (see FIG. 10C).

After the classification information registration process, at step SC2, the information management unit 602 judges if the security information is received in the receiving unit 601 or not, and in this case it is judged No. Herein, the user 500 discovering a bug (security hole) in software X creates security information 800 shown in FIG. 9A with the aid of the user client 501. By the operation by the user 500, the security information 800 is transmitted from the user client 501 to the security information mediation apparatus 600.

Receiving this security information 800 in the receiving unit 601, the information management unit 602 judges Yes at step SC2. At step SC3, the information management unit 602 retrieves the security information database 603 shown in FIG. 10A, using the "registering person" and "content of security information" of the security information 800 as the key. In this case, suppose only records of "registration No."=1 and 2 are present in the security information database 603.

At step SC4, the information management unit 602 judges if the retrieval is successful or not, that is, whether the same content as the security information 800 is registered in the security information database 603 or not, and if judged Yes, at step SC15, the information management unit 602 rejects registration. In this case, the information management unit 602 judges No at step SC4.

At step SC5, the information management unit 602, on the basis of the content of the received security information 800, executes the classification process by judging the classification of the security information 800 in the preset classes (for example, A to Z).

In this case, suppose the information management unit 602 has judged the security information 800 to be classification A. At step SC6, the information management unit 602 registers the security information 800 in the security information database 603 (see FIG. 10A) corresponding to classification A. As a result, in the security information database 603, a record of "registration No."=3 (corresponding to security information 800) is added.

At step SC7, the information management unit 602 accesses the classification information database 606 by way of the transfer unit 605, and retrieves the classification information database 606 shown in FIG. 10C, using classification A of the security information 800 as the key. At step SC8, the information management unit 602 judges whether same classification as classification A of the security information800 is present or not in the classification information database 606.

In this case, since the classification (A) of "the developer" (developer 701A) in the classification information database 606 coincides with the classification A of the security information 800, the information management unit 602 judges Yes at step SC8. If judged No at step SC8, the information management unit 602 repeats the process after step SC2.

At step SC9, the information management unit 602 transfers the security information 800 addressed to the developer client 700A to the transfer unit 605. As a result, the transfer unit 605 transfers the security information 800 to the developer client 700A. In this case, the security information 800 is not transferred to the developer client 700B. At step SC10, the information management unit 602 judges if the reply information is received in the receiving unit 607, and it is judged No in this case.

When the security information 800 is received by the developer client 700A, the developers 701A judges if the security information 800 is valid information or not. In this case, suppose the developer 701A judges the security information 800 to be valid. At the developer 701A, using the developer client 700A, the reply information 801 (see FIG. 9B) and payment information 802 (see FIG. 9C) are created, and they are sent to the security information mediation apparatus 600. The reply information 801 and payment information 802 are received in the receiving unit 607 of the security information mediation apparatus 600 through the network 702.

As a result, the information management unit 602 judges Yes at step SC10. At step SC11, the information management unit 602 registers the reply information 801 in the reply information database 604 (see FIG. 10B). Consequently, a record of "reply No."=3 (corresponding to the reply information 801) is added to the reply information database 604.

At step SC12, the information management unit 602 judges if the result of judgment of the reply information 801 shown in FIG. 9B is valid or not, and it is judged Yes herein. At step SC13, the information management unit 602 judges if the payment information 802 corresponding to the reply information 801 is received in the receiving unit 607 or not, and it is judged Yes in this case. If judged No at step SC13, the information management unit 602 repeats the same judgment.

At step SC14, the information management unit 602 transfers the reply information 801 and payment information 802 to the transfer unit 608. As a result, the transfer unit 608 transfers the reply information 801 and payment information 802 to the user client 501 through the network 502.

When the reply information 801 and payment information 802 are received in the user client 501, the user client 501 informs the user 500 of the reply information 801 and payment information 802. As a result, the user 500 understands that the security information 800 the user has presented was useful, and recognizes that 10000 yen is paid from the developer 701A by electronic settlement.

On the other hand, if judged No at step SC12, that is, when the reply information of "judging result"="invalid" is received in the receiving unit 607, at step SC16, the information management unit 602 transfers the reply information as reject message to a transfer unit 608. As a result, the transfer unit 608 transfers the reply information (reject message) to the user client 501 through the network 502. When this reply information (reject message) is received in the user client 501, the user client 501 informs the user 500 of the reply information. As a result, the user 500 understands that the presented security information was invalid.

As explained herein, according to the third embodiment, by registering the classification information of the security information desired by the developer 701A and developer 701B in the classification information database 606, and transferring the security information 800, for example, to the developer client 700A only when the classification information coincides with the classification result of the security information 800 presented from the user 500, it saves the wasteful time of transferring unnecessary security information, so that the security information may be collected more efficiently.

In the third embodiment, the security information is shared between the concerned parties (user and developer), but the security information or patch information for correcting the computer program may be disclosed to a third party or general users. This case is explained as a fourth embodiment.

Figure 12:
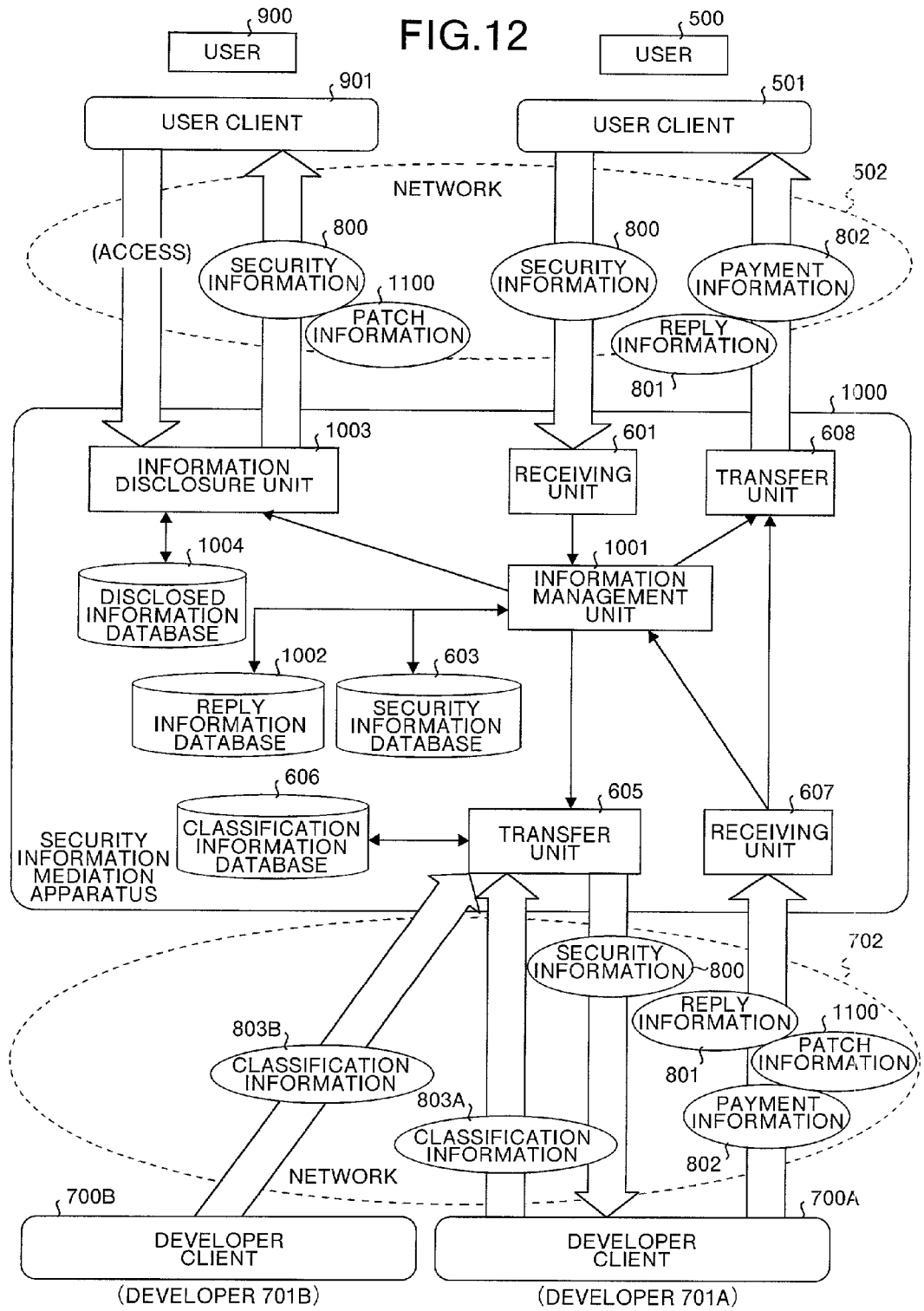
FIG. 12 is a block diagram showing a configuration of a fourth embodiment of the invention.

FIG. 12 is a block diagram showing a configuration of the fourth embodiment of the invention. In this figure, the same parts corresponding to the components in FIG. 8 are identified with same legends. As shown in this figure, a security information mediation apparatus 1000 is provided instead of the security information mediation apparatus 600 shown in FIG. 8.

In this security information mediation apparatus 1000, an information management unit 1001 and a reply information database 1002 are provided instead of the information management unit 602 and reply information database 604 shown in FIG. 8. Further, in the security information mediation apparatus 1000, an information disclosing unit 1003 and a disclosed information database 1004 are newly provided. In FIG. 12, moreover, a user client 901 to be operated by a user 900 is provided.

The security information mediation apparatus 1000 is a server mediating security information or patch information between the users 500 and 900 and developers 701A and 701B, and is interposed between the network 502 and network 702. The security information mediation apparatus 1000 is accessed by the user client 501, user client 901, and developer clients 700A and 700B.

In the security information mediation apparatus 1000, a receiving unit 607 receives patch information 1100 from the developer client 700A, in addition to the reply information 801 and payment information 802 mentioned above. This patch information 1100 is, as shown in FIG. 13C, composed of "reply No." (3) Corresponding to the reply information 801, "replying person" (developer 701A), and patch program, and this is the information for correcting the computer program having a security hole.

The information management unit 1001 has a function of registering the security information (in the diagram, security information 800) received in the receiving unit 601 in the security information database 603. The information management unit 1001 also has a function of registering the reply information (in the diagram, reply information 801)

received in the receiving unit 607 in the reply information database 1002 shown in FIG. 13A.

This reply information database 1002, like the reply information database 604 (see FIG. 10B), is divided into the columns of "reply No." given in the order of registration of reply information, "date of reply", "registration No.", "replying person", "classification", and "judging result". The reply information database 1002 also has a column for "correcting method". This "correcting method" is the information showing the method of correction (for example, patch) of computer program having a security hole. In the diagram, a record of "reply No."=3 corresponds to the reply information 801 (see FIG. 9B).

The information management unit 1001, like the information management unit 602, transfers the reply information (in the diagram, reply information 801) of which result of judgment is valid or invalid, and the payment information (in the diagram, payment information 802) to the transfer unit 608. Also, the information management unit 1001 transfers the security information, reply information and patch information to the information disclosing unit 1003.

The information disclosing unit 1003 has a function of disclosing security information, reply information, and patch information to the user client 901 of the user 900 or a third party through an information disclosing screen 1200 (see FIG. 14) on the web site. The information disclosing unit 1003 registers the security information, reply information and patch information from the information management unit 1001 in the disclosed information database 1004 shown in FIG. 13B.

This disclosed information database 1004 is, same as the reply information database 1002 (see FIG. 13A), composed of "reply No.", "classification", "content of security information", "replying person", "correcting method", "security information pointer", and "patch information pointer". The "security information pointer" is a pointer indicating a region in which the security information is actually stored, and the "patch information pointer" is a pointer indicating a region in which the patch information is actually stored.

Figure 15:
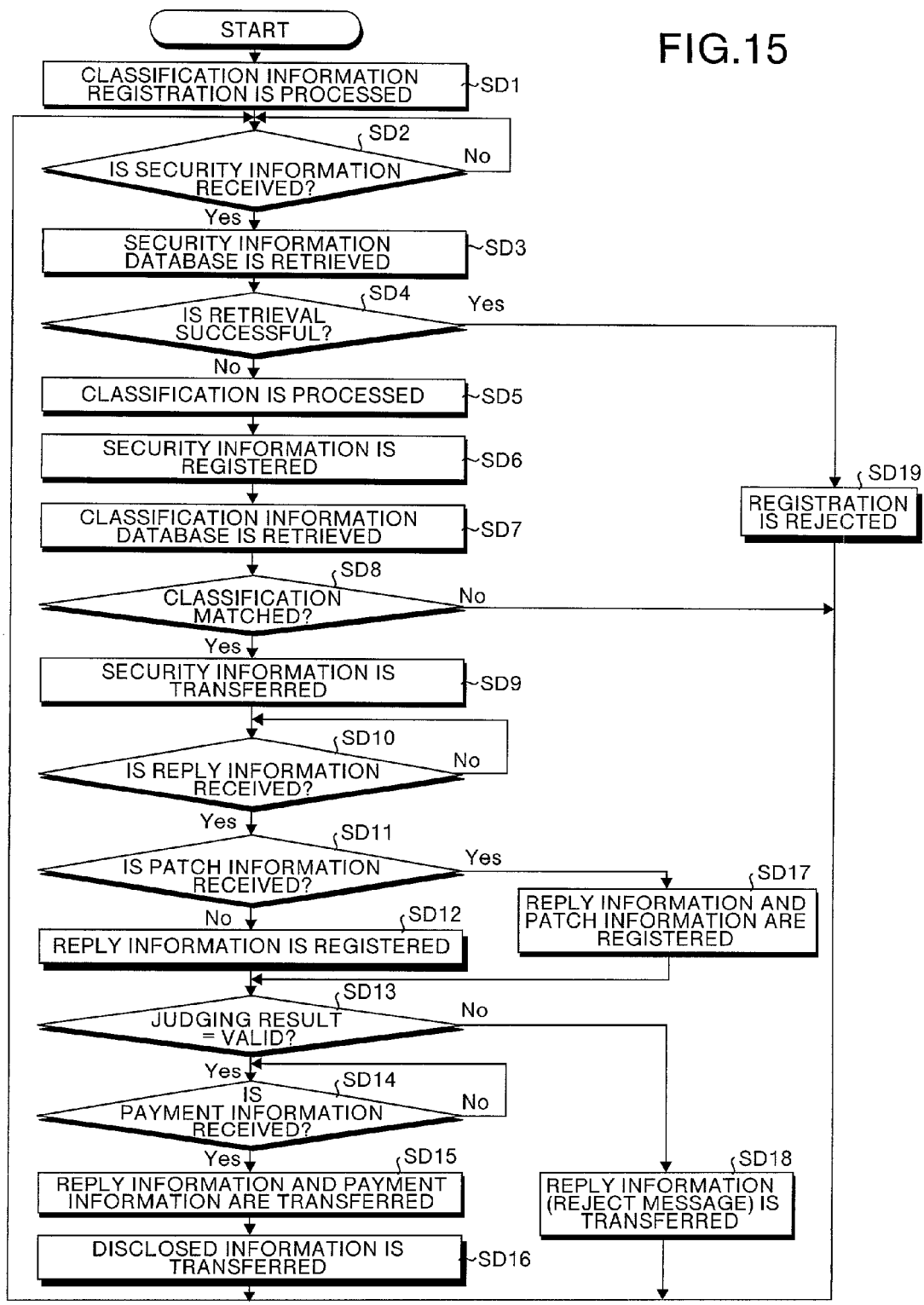
FIG. 15 is a flowchart for explaining the operation in the fourth embodiment.

The operation of the fourth embodiment is explained below by referring to the flowchart in FIG. 15. At step SD1 in the diagram, the transfer unit 605, same as at step SD1 (see FIG. 11), registers the classification information 803A (see FIG. 9D) and classification information 803B (see FIG. 9E) in the classification information database 606 (see FIG. 10C).

At step SD2, the information management unit 1001 judges if the security information is received in the receiving unit 601 or not, and in this case it is judged No. Herein, the user 500 discovering a bug (security hole) in software X creates security information 800 shown in FIG. 9A with the aid of the user client 501. By the operation by the user 500, the security information 800 is transmitted from the user client 501 to the security information mediation apparatus 1000.

Receiving this security information 800 in the receiving unit 601, the information management unit 1001 judges Yes at step SD2. At step SD3, the information management unit 1001 retrieves the security information database 603 shown in FIG. 1A, using the "registering person" and "content of security information" of the security information 800 as the key. In this case, suppose only records of "registration No."=1 and 2 are present in the security information database 603.

At step SD4, the information management unit 1001 judges if the retrieval is successful or not, that is, whether the same content as the security information 800 is registered in the security information database 603 or not, and if judged Yes, at step SD19, the information management unit 1001 rejects registration. In this case, the information management unit 1001 judges No at step SD4.

At step SD5, the information management unit 1001, on the basis of the content of the received security information 800, executes the classification process by judging the classification of the security information 800 in the preset classes (for example, A to Z).

In this case, suppose the information management unit 1001 has judged the security information 800 to be classification A. At step SD6, the information management unit 1001 registers the security information 800 in the security information database 603 (see FIG. 10A) corresponding to classification A. As a result, in the security information database 603, a record of "registration No."=3 (corresponding to security information 800) is added. Further, the information management unit 1001 transfers the security information 800 to the information disclosing unit 1003. As a result, the information disclosing unit 1003 registers the security information 800 in the disclosed information database 1004.

At step SD7, the information management unit 1001 accesses the classification information database 606 by way of the transfer unit 605, and retrieves the classification information database 606 shown in FIG. 10C, using classification A of the security information 800 as the key. At step SD8, the information management unit 1001 judges whether same classification as classification A of the security information 800 is present or not in the classification information database 606.

In this case, since the classification (A) of "the developer" (developer 701A) in the classification information database 606 coincides with the classification A of the security information 800, the information management unit 1001 judges Yes at step SD8. If judged No at step SD4, the information management unit 1001 repeats the process after step SD2.

At step SD9, the information management unit 1001 transfers the security information 800 addressed to the developer client 700A to the transfer unit 605. As a result, the transfer unit 605 transfers the security information 800 to the developer client 700A. In this case, the security information 800 is not transferred to the developer client 700B. At step SD10, the information management unit 1001 judges if the reply information is received in the receiving unit 607, and it is judged No in this case.

When the security information 800 is received by the developer client 700A, the developers 701A judges if the security information 800 is valid information or not. In this case, suppose the developer 701A judges the security information 800 to be valid. At the developer 701A, using the developer client 700A, the reply information 801 (see FIG. 9B), payment information 802 (see FIG. 9C), and patch information 1100 (see FIG. 13C) are created, and they are sent to the security information mediation apparatus 1000. The reply information 801, payment information 802, and patch information 1100 are received in the receiving unit 607 of the security information mediation apparatus 1000 through the network 702.

As a result, the information management unit 1001 judges Yes at step SD10. At step SD11, the information management unit 1001 judges if the patch information is received in the receiving unit 607 or not, and it is judged Yes in this case. At step SD17, the information management unit 1001 registers the reply information 801 and patch information 1100 in the reply information database 1002 (see FIG. 13A).

The information management unit 1001 transfers the reply information 801 and patch information 1100 to the information disclosing unit 1003. As a result, the information disclosing unit 1003 registers the reply information 801 and patch information 1100 in the disclosed information database 1004 (see FIG. 13B). On the other hand, if judged No at step SD11, the information management unit 1001 registers the reply information 801 in the replay information database 1002 (see FIG. 13A).

At step SD13, the information management unit 1001 judges if the result of judgment of the reply information 801 shown in FIG. 9B is valid or not, and it is judged Yes herein. At step SD14, the information management unit 1001 judges if the payment information 802 corresponding to the reply information 801 is received in the receiving unit 607 or not, and it is judged Yes in this case. If judged No at step SD14, the information management unit 1001 repeats the same judgment.

At step SD15, the information management unit 1001 transfers the reply information 801 and payment information 802 to the transfer unit 608. As a result, the transfer unit 608 transfers the reply information 801 and payment information 802 to the user client 501 through the network 502.

When the reply information 801 and payment information 802 are received in the user client 501, the user client 501 informs the user 500 of the reply information 801 and payment information 802. As a result, the user 500 understands that the security information 800 the user has presented was useful, and recognizes that 10000 yen is paid from the developer 701A by electronic settlement.

On the other hand, if judged No at step SD13, that is, when the reply information of "judging result"="invalid" is received in the receiving unit 607, at step SD18, the information management unit 1001 transfers the reply information as reject message to a transfer unit 608. As a result, the transfer unit 608 transfers the reply information (reject message) to the user client 501 through the network 502. When this reply information (reject message) is received in the user client 501, the user client 501 informs the user 500 of the reply information. As a result, the user 500 understands that the presented security information was invalid.

Figure 16:
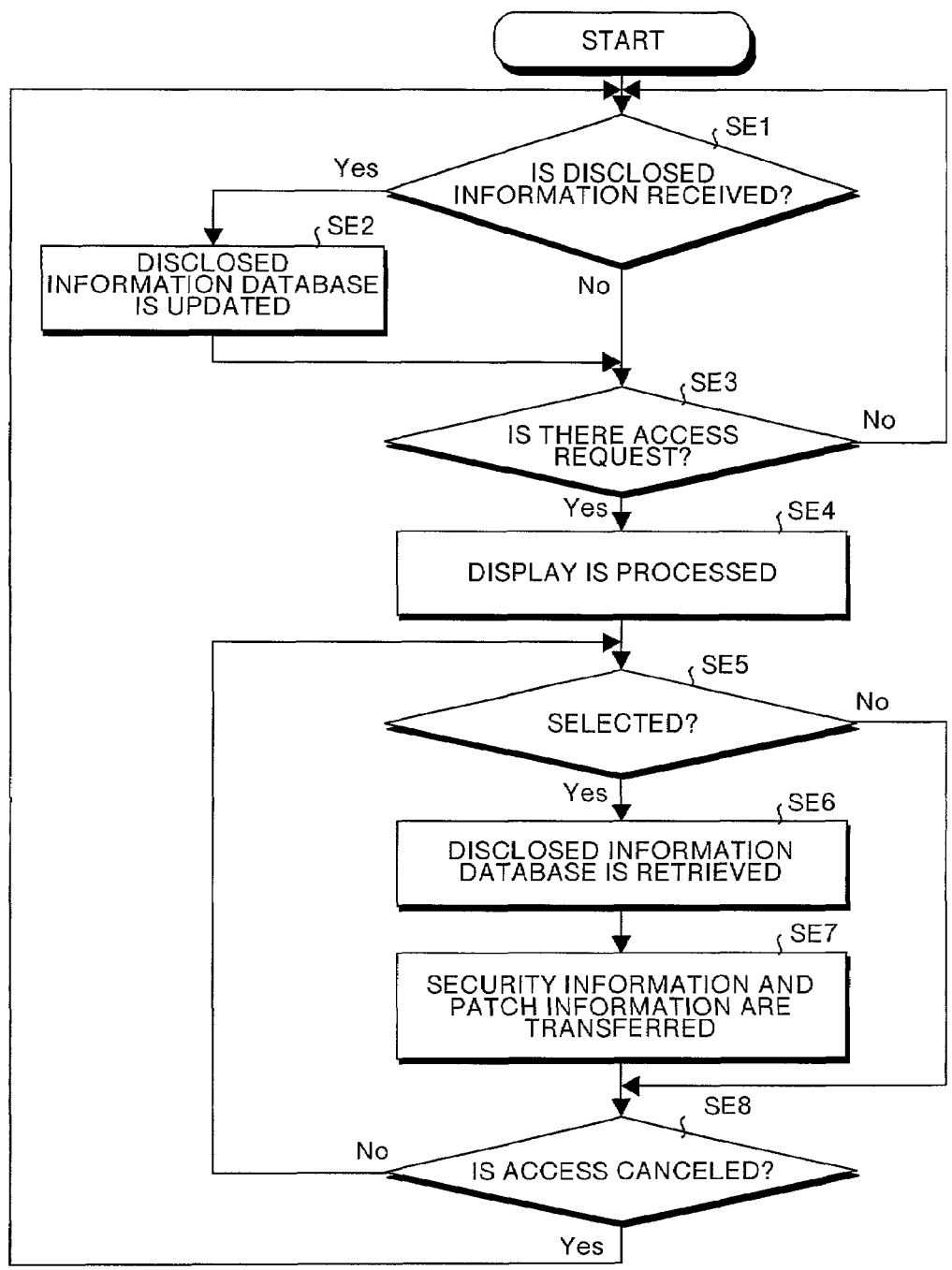
FIG. 16 is a flowchart for explaining the operation of information disclosure unit 1003 shown in FIG. 12.

The operation of the information disclosing unit 1003 shown in FIG. 12 is explained while referring to the flowchart shown in FIG. 16. At step SE1, the information disclosing unit 1003 judges if the disclosed information (security information, reply information, patch information) from the information management unit 1001 has been received or not, and if judged Yes, the disclosed information database 1004 is updated at step SE2.

If judged No at step SE1, on the other hand, going to step SE3, the information disclosing unit 1003 judges if there is an access request from the user client (in the diagram, user client 901), and if judged No, the process after step SE1 is repeated. If there is an access request from the user client 901, the information disclosing unit 1003 judges Yes at step SE3.

At step SE4, the information disclosing unit 1003, on the basis of the disclosed information database 1004 (see FIG. 13B), executes the process of displaying the information disclosing screen 1200 shown in FIG. 14 in the display unit (not shown) of the user client 901. This information disclosing screen 1200 is a screen for disclosing the security information ("reply information", "classification", "content of security information", "replying person", "correcting method") to the user 900.

At step SE5, the information disclosing unit 1003 judges if desired security information is selected or not by the user 900 from the information disclosing screen 1200, and it is judged No in this case. At step SE8, the information disclosing unit 1003 judges if the access is canceled or not, specifically if an end button 1201 (see FIG. 14) is pressed or not, and it is judged No in this case, and the process after step SE5 is repeated.

When the reply No. 3 shown in FIG. 14 is entered by the user 900, and the security information corresponding to reply No. 3 is selected, the information disclosing unit 1003 judges Yes at step SE5. At step SE6, the information disclosing unit 1003 retrieves the disclosed information database 1004 shown in FIG. 13, using reply No. 3 as the key, and security information pointer PS3 and patch information pointer PP3 are acquired.

Consequently, the information disclosing unit 1003, on the basis of the security information pointer PS3 and patch information pointer PP3, acquires the security information 800 and patch information 1100 from the disclosed information database 1004. At step SE7, the information disclosing unit 1003 transfers the security information 800 and patch information 1100 to the user client 901 through the network 502. Herein, when the end button 1201 is pressed by the user 900, the information disclosing unit 1003 judges Yes at step SE8, and the process after step SE1 is repeated.

When the security information 800 and patch information 1100 are received in the user client 901, the user 900 recognizes the content of the security information 800, and applies the patch program of the patch information 1100 to software X. As a result, software X is corrected.

In the fourth embodiment, by registering the classification information of the client information desired by the user 900 preliminarily in the information disclosing unit 1003, when the access is requested from the user client 901, the security information (patch information) corresponding to the classification information may be extracted from the disclosed information database 1004, and it may be disclosed to the user 900. Also in the fourth embodiment, in addition to the reply information 801 and payment information 802, the patch information 1100 may be also transferred to the user client 501.

As described herein, according to the fourth embodiment, since the security information is disclosed by the information disclosing unit 1003, it may draw attention of a third party (user 900) about presentation of security information, and presentation of multiple security information may be expected. Also according to the fourth embodiment, since the patch information 1100 is transferred to the user client 901 (user client 501), measures against security can be taken promptly.

The first to fourth embodiments of the invention have been described herein while referring to the accompanying drawings, but specific examples are not limited to the first to fourth embodiments alone, and design changes within the scope not departing from the true spirit of the invention are also included in the invention.

Figure 17:
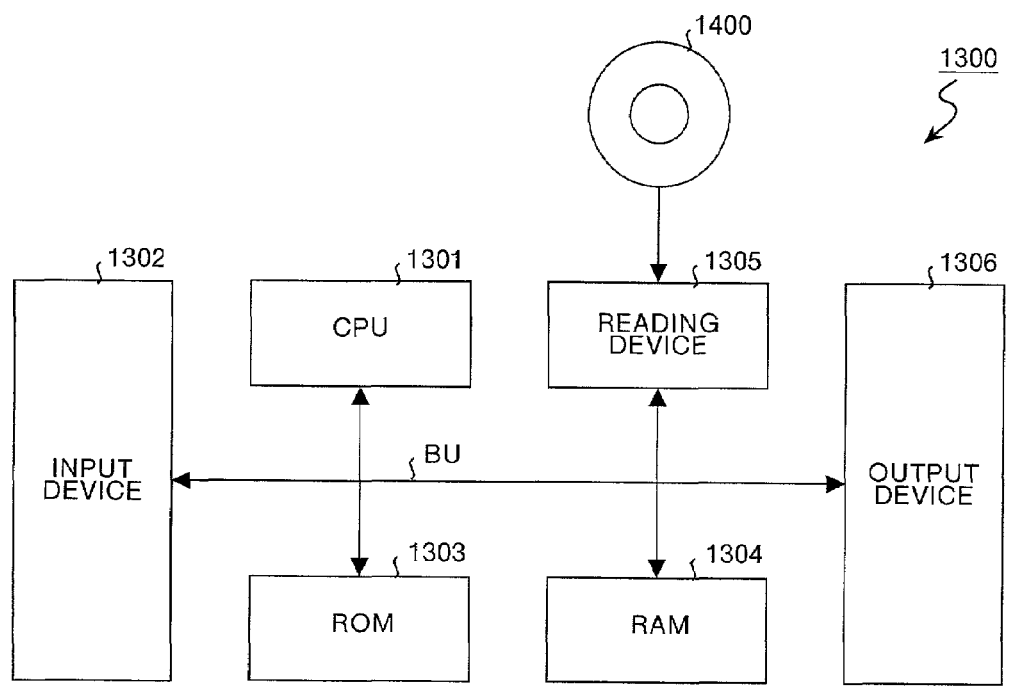
FIG. 17 is a block diagram showing a modified example of the first to fourth embodiments of the invention.

For example, in the first to fourth embodiments, a security information mediation program for realizing the function of mediating security information may be recorded in a computer-readable recording medium 1400 shown in FIG. 17, and the security information mediation program recorded in this recording medium 1400 may be read in a computer 1300 shown in the same diagram, and executed to mediate the security information.

The computer 1300 shown in FIG. 17 comprises a CPU 1301 for executing the security information mediation program, an input device 1302 including keyboard and mouse, a ROM (read only memory) 1303 for storing various data, a RAM (random access memory) 1304 for storing operation parameters, a reading device 1305 for reading the security information mediation program from the recording medium 1400, an output device 1306 such as display and printer, and bus BU for connecting the devices and parts.

The CPU 1301 reads in the security information mediation program recorded in the recording medium 1400 through the reading device 1305, and executes the security information mediation program, and mediates the security information. The recording medium 1400 includes not only portable recording media such as optical disk, floppy disk, and hard disk, but also transfer medium for temporarily recording and holding the data such as the network.

As described herein, according to the invention, the security information from the information contributor is directly presented to the information recipient, and reward is paid to the contributor presenting useful security information, and therefore the environment is easy for the information contributor (user) to present security information, while the information recipient (for example, developer) can collect useful security information at low cost.

Furthermore, since only when the security information presented from the information contributor is new, such security information is transferred to the information recipient's terminal, it saves the wasteful time of transferring unnecessary security information to the information recipient's terminal, so that the security information may be collected efficiently.

Furthermore, by registering the classification information of the security information desired by the information contributor, and transferring the security information to the information recipient's terminal only when the classification information coincides with the classification result of the presented security information, it saves the wasteful time of transferring unnecessary security information, so that the security information may be collected more efficiently.

Furthermore, since the invalidity information showing invalidity of the security information presented from the information contributor is transferred to the information contributor, it is effective to improve the service for the user interested in the manner of use (valid or invalid) of the presented security information.

Furthermore, since correction information as measure for security information showing usefulness is transferred to the information contributor, measures against security information can be taken promptly.

Furthermore, since the security information is disclosed, it may draw attention of a third party about presentation of security information, and presentation of multiple security information may be expected.

Furthermore, since the security information and correction information are disclosed, it may draw attention of a third party about presentation of security information, and presentation of multiple security information may be expected, and moreover measures against security information can be taken promptly.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A security information mediation apparatus connected between a first terminal at an information contributor and a second terminal at an information recipient, the security information mediation apparatus comprising:

a first receiving unit which receives security information from the first terminal, the security information comprising information regarding a design error or bug in a computer program;

a first registering unit which registers the security information in a first database;

a first transfer unit which receives the security information from the first registering unit and transfers the security information registered by the first registering unit to the second terminal for the information recipient to judge usefulness of the security information;

a second receiving unit which receives at least reply information including the usefulness of the security information corresponding to the security information from the second terminal;

a second registering unit which registers at least the reply information in a second database; and a second transfer unit which receives at least the reply information from the second registering unit and transfers the reply information to the first terminal, wherein when the information recipient finds that the security information has usefulness, the second receiving unit receives payment information on an information presentation fee to be paid to the information contributor from the second terminal, the second registering unit registers the payment information together with the reply information, and the second transfer unit transfers the payment information together with the reply information to the first terminal.

2. The security information mediation apparatus according to claim 1, wherein said first registering unit refers to the registered security information in the first database, and registers the security information from the first terminal in the first database only if the security information from the first terminal is new, and said first transfer unit transfers the security information from the first terminal to the second terminal only if the security information from the first terminal is new.

3. The security information mediation apparatus according to claim 1, further comprising:

a classification information registering unit which registers classification information of the security information desired by the information recipient; and a classification unit which classifies the security information from the first terminal, wherein said first transfer unit transfers the security information to the second terminal only if the classification information and classification result of said classification unit coincide.

4. The security information mediation apparatus according to claim 1, wherein the second receiving unit receives invalidity information showing invalidity of the security information from the second terminal, and said second transfer unit transfers the invalidity information to the first terminal.

5. The security information mediation apparatus according to claim 1, wherein the second receiving unit receives, from the second terminal, correction information as a measure for the security information of which usefulness is shown and said second transfer unit transfers the correction information to the first terminal.

6. The security information mediation apparatus according to claim 5, further comprising a disclosing unit which discloses the security information registered by the first registering unit and the correction information.

7. The security information mediation apparatus according to claim 1, further comprising a disclosing unit which discloses the security information registered by the first registering unit.

8. A security information mediation method, comprising:
receiving security information from a first terminal at an information contributor, the security information comprising information regarding a design error or bug in a computer program;
first registering the security information in a first database;
receiving the security information registered at the first registering and transferring the security information registered at the first registering to a second terminal at an information recipient for judging usefulness of the security information;
receiving at least reply information including the usefulness of the security information corresponding to the security information from the second terminal;
registering at least the reply information in a second database; and
receiving at least the reply information and transferring the reply information to the first terminal, wherein
when the information recipient finds that the security information has usefulness, the receiving of at least the reply information includes receiving payment information on an information presentation fee to be paid to the information contributor from the second terminal, the registering of at least the reply information includes registering the payment information together with the reply information, and the receiving at least the reply information and transferring includes transferring the payment information together with the reply information to the first terminal.

9. The security information mediation method according to claim 8, wherein the registering the security information includes referring to the registered security information in the first database, and registering the security information from the first terminal only if the security information from the first terminal is new, and the receiving the security information registered at the first registering step and transferring includes transferring the security information from the first terminal to the second terminal only if the security information from the first terminal is new.

10. The security information mediation method according to claim 8, further comprising:
registering classification information of the security information desired by the information recipient; and
classifying the security information from the first terminal,
wherein the receiving the security information registered at the first registering and transferring includes transferring the security information to the second terminal only if the classification information and classification result at the classifying coincide.

11. The security information mediation method according to claim 8, wherein the receiving at least reply information includes receiving invalidity information showing invalidity of the security information from the second terminal, and the receiving at least the reply information and transferring transfers the invalidity information to the first terminal.

12. The security information mediation method according to claim 8, wherein the receiving at least reply information includes receiving from the second terminal, correction information as a measure for the security information of which usefulness is shown and the receiving at least the reply information and transferring includes transferring the correction information to the first terminal.

13. The security information mediation method according to claim 8, further comprising disclosing the security information registered at the first registering step.

14. The security information mediation method according to claim 12, further comprising disclosing the security information registered at the first registering step and the correction information.

15. A computer readable medium for storing instructions, which when executed by a computer, causes the computer to perform:
first receiving security information from a first terminal at an information contributor, the security information comprising information regarding a design error or bug in a computer program;
registering the security information in a first database;
receiving the security information registered at the first registering and transferring the security information registered at the first registering to a second terminal at an information recipient for judging usefulness of the security information;
receiving at least reply information including the usefulness of the security information corresponding to the security information from the second terminal;
registering at least the reply information in a second database; and
receiving at least the reply information registered at the second registering step and transferring the reply information registered at the second registering step to the first terminal, wherein
when the information recipient finds that the security information has usefulness, the receiving at least reply information includes receiving payment information on an information presentation fee to be paid to the information contributor from the second terminal, the registering at least the reply information includes registering the payment information together with the reply information, and the receiving at least the reply information includes transferring the payment information together with the reply information to the first terminal.

* * * * *